(No Model.) 2 Sheets—Sheet 1.

W. N. GRAVES.
CLAY PULVERIZER.

No. 340,999. Patented May 4, 1886.

(No Model.) 2 Sheets—Sheet 2.

W. N. GRAVES.
CLAY PULVERIZER.

No. 340,999. Patented May 4, 1886.

Attest:
Charles Pickles
F. A. Hopkins

Inventor:
W. N. Graves
By Knight Bros
Attys.

UNITED STATES PATENT OFFICE.

WILLIS N. GRAVES, OF ST. LOUIS, MISSOURI, ASSIGNOR OF ONE-HALF TO THE HYDRAULIC PRESS BRICK COMPANY, OF SAME PLACE.

CLAY-PULVERIZER.

SPECIFICATION forming part of Letters Patent No. 340,999, dated May 4, 1886.

Application filed November 9, 1885. Serial No. 182,280. (No model.)

*To all whom it may concern:*

Be it known that I, WILLIS N. GRAVES, of the city of St. Louis, in the State of Missouri, have invented a certain new and useful Improvement in Clay-Pulverizers, of which the following is a full, clear, and exact description, reference being had to the accompanying drawings, forming part of this specification, and in which—

Figure 1:
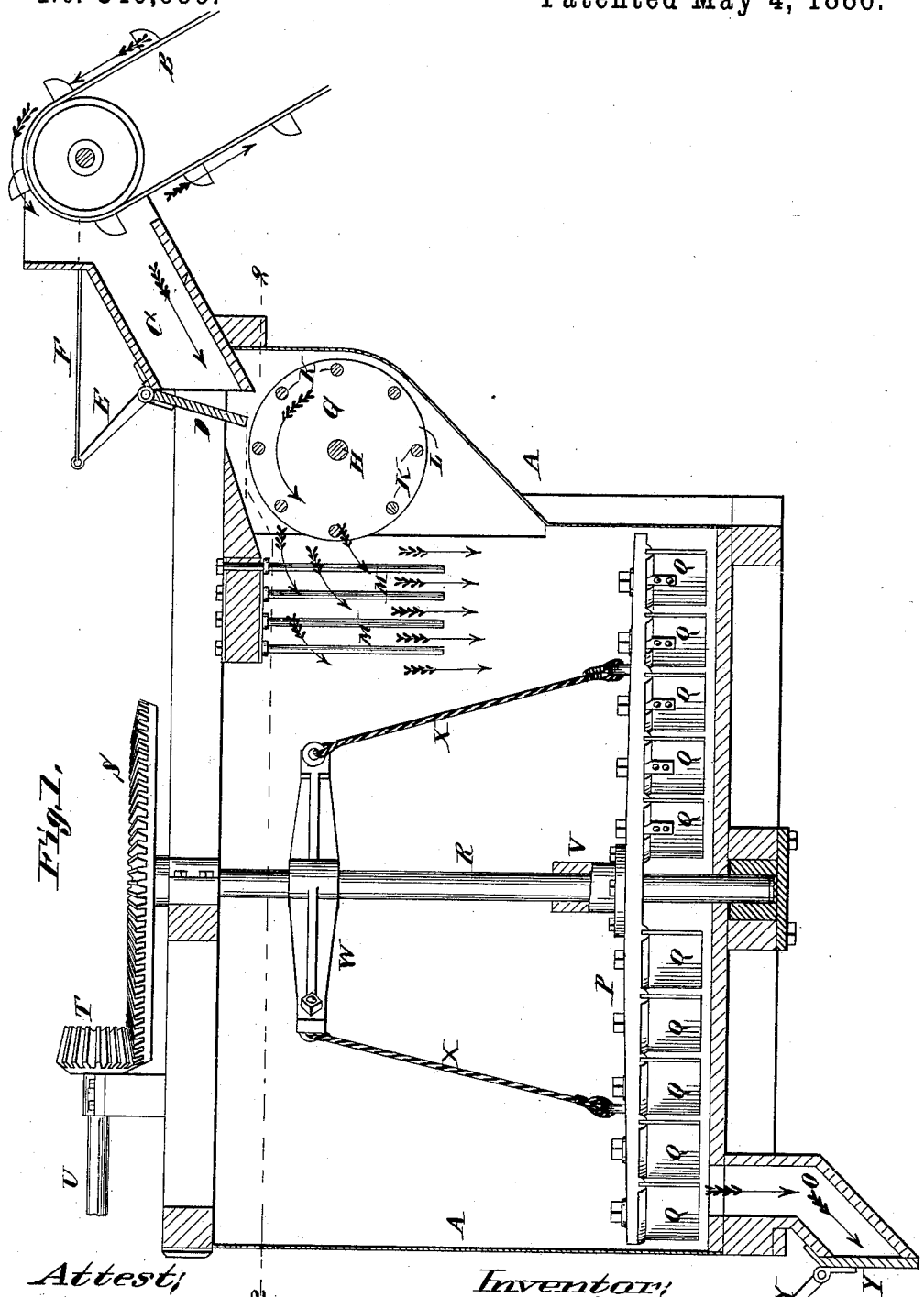
Figure 2:
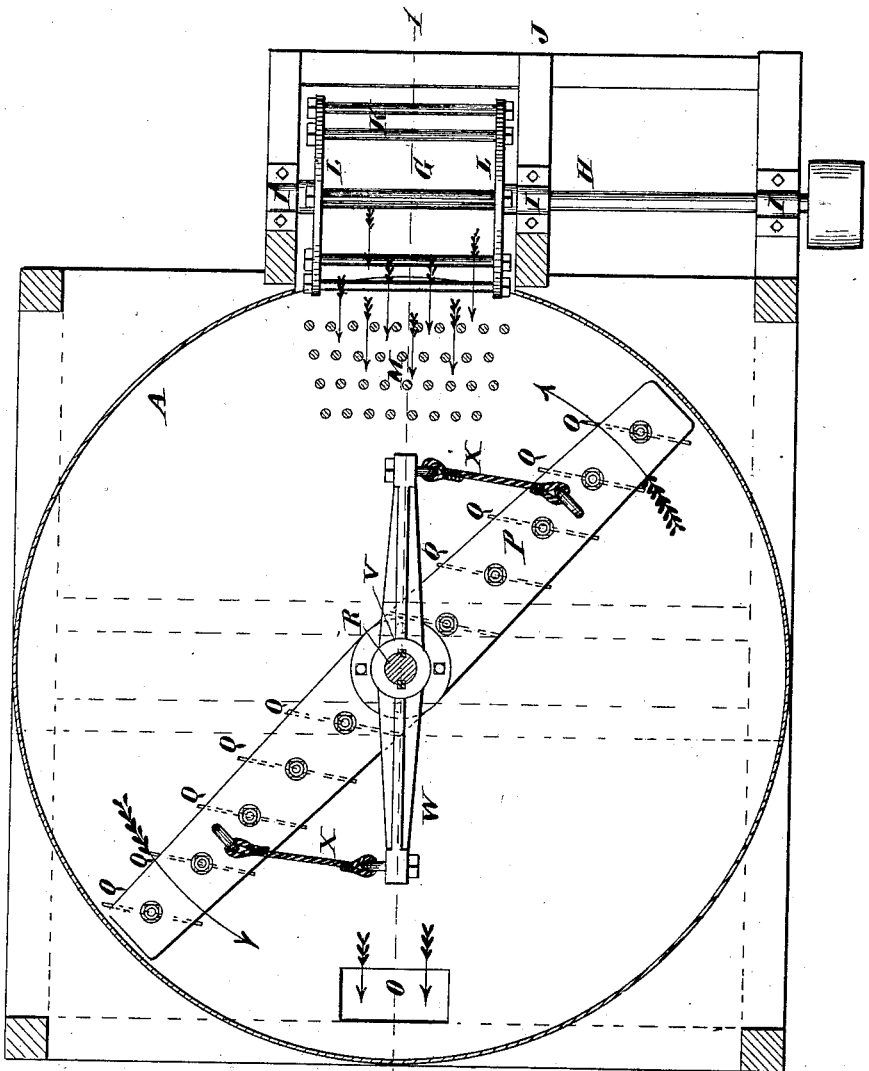

Figure 1 is a vertical longitudinal section of the device, taken on line 1 1, Fig. 2. Fig. 2 is a horizontal section taken on line 2 2, Fig. 1.

My invention relates to an improved device for pulverizing clay; and it consists in features of novelty hereinafter fully described, and pointed out in the claims.

Referring to the drawings, A represents the frame of the apparatus, which consists of a case or box, preferably of cylindrical form, as shown in Fig. 2.

B represents an elevator of any suitable form for carrying the dirt up and discharging it into chute C, which discharges it into the case or box, as shown in Fig. 1. The lower end of the chute is provided with an adjustable deflector, D, hinged to the chute, and provided with an arm, E, to which is connected a rod, F. By opening the deflector more or less the dirt is thrown more or less perpendicularly onto a pulverizing-reel, G, supported on a driving-shaft, H, journaled in boxes I, secured to an extension, J, of the box or case. This reel consists of bars K and disks L, the bars being secured to the disks, as shown in Fig. 2. This reel is made to revolve at a high velocity, and throws the dirt as it falls from the chute against vertical rods or arms M, depending downward from the top of the case, as shown in Fig. 1. These bars or rods are set so as to be out of line with each other, and the dirt as it is thrown against them by the reel will be pulverized, and from them it falls into the bottom of the case, and is conveyed over the bottom of the case to a discharge-spout, O, at the other side of the case from the reel. It is carried over by means of a conveyer consisting of a bar, P, from which depends a number of shovels, Q, secured to the bar, and set at an angle to the axis of the bar, as shown. Each one of these shovels conveys the dirt a short distance, and it is then caught by the next shovel upon the next revolution of the bar and carried a short distance farther, until it is carried entirely across the box and discharged through the spout, as shown by the arrows in Fig. 2. The bar is mounted upon a vertical shaft, R, driven by a suitable cog-wheel, S, and pinion T, which connect it to a driving-shaft, U. The direction in which the bar turns is indicated by large arrows, Fig. 2. The shaft passes loosely through this bar and a collar, V, secured thereto. To cause the bar to turn with it, and yet be allowed vertical movement to accommodate itself to the amount of clay in the case, I connect them by means of a beam, W, and ropes or chains X. As the shaft is turned, the connection between it and the bar causes the movement of the latter, as shown in Fig. 2, while the bar is allowed to rise or fall to accommodate itself to the amount of clay in the bottom of the box or case.

The discharge-chute may be provided with a valve or lid, Y, operated by a crank, Y', and rod Z.

As the clay is discharged into the case from the elevator chute or spout, it is first broken and pulverized by the reel, which throws it, as stated, and as shown by the arrows, against the vertical rods, and by being thrown against these rods it is further pulverized, and then as it is conveyed and turned over by the shovels it is further pulverized and broken up, so that by the time it is discharged from the case it is thoroughly pulverized and in the best condition to be used in the manufacture of bricks.

I claim as my invention—

1. The combination of the chute, the reel upon which the clay falls from said chute, and the stationary rods against which it is thrown by said reel, as set forth.

2. In a clay-pulverizer, the combination of the chute, a reel rotating upon a horizontal axis, and rods placed transverse to the axis of said reel, against which the clay is thrown, as set forth.

3. In a clay-pulverizing apparatus, the combination of the reel, vertical bars, conveyer, box or case in which the conveyer is located, and means for turning the conveyer and allowing it to move vertically, substantially as shown and described.

4. The combination of the reel, vertical rods, box or case, conveyer located within the box or case, consisting of a bar and shovels, shaft passing through the bar of the conveyer, beam secured to the shaft, and flexible connection between the beam and conveyer, substantially as shown and described.

5. In a clay-pulverizing apparatus, the combination of the delivery-chute, adjustable deflector secured to the chute, revolving reel against which the clay falls from the chute, bars against which the clay is thrown by the revolving reel, box or case, and a conveyer located within the box or case, substantially as described.

6. In a clay-pulverizing apparatus, the combination of the discharge-chute provided with an adjustable deflector, a reel against which the clay falls from the chute, and bars against which the clay is thrown by the reel, substantially as set forth.

WILLIS N. GRAVES.

In presence of—
GEO. H. KNIGHT,
EDW. S. KNIGHT.